United States Patent
Anma

(10) Patent No.: US 9,566,999 B2
(45) Date of Patent: Feb. 14, 2017

(54) STEERING APPARATUS AND HOUSING FOR STEERING APPARATUS

(71) Applicant: Showa Corporation, Gyoda-shi (JP)

(72) Inventor: Yuusuke Anma, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 14/445,287

(22) Filed: Jul. 29, 2014

(65) Prior Publication Data

US 2015/0217798 A1 Aug. 6, 2015

(30) Foreign Application Priority Data

Feb. 6, 2014 (JP) ................. 2014-021659

(51) Int. Cl.
*B62D 5/04* (2006.01)
*B62D 3/12* (2006.01)
*B62D 6/10* (2006.01)

(52) U.S. Cl.
CPC .............. *B62D 3/12* (2013.01); *B62D 5/0403* (2013.01); *B62D 6/10* (2013.01)

(58) Field of Classification Search
CPC ............................... B62D 5/0421; B62D 5/00
USPC ................................................ 180/443, 444
See application file for complete search history.

(56) References Cited

U.S. PATENT DOCUMENTS

| | | | | |
|---|---|---|---|---|
| 7,281,444 B1* | 10/2007 | Bishop | ...................... | 74/388 PS |
| 7,665,571 B2* | 2/2010 | Kobayashi | .................... | 180/444 |
| 2006/0118351 A1* | 6/2006 | Chikaraishi | ................... | 180/443 |
| 2010/0147620 A1* | 6/2010 | Ishihara et al. | ............... | 180/443 |
| 2011/0120798 A1* | 5/2011 | Kawada et al. | .............. | 180/444 |
| 2011/0303044 A1 | 12/2011 | Lee | | |
| 2013/0180794 A1* | 7/2013 | Shiino | ...................... | B62D 5/04 180/444 |
| 2014/0076654 A1* | 3/2014 | Yoshida | .................. | G01L 5/221 180/446 |

FOREIGN PATENT DOCUMENTS

| | | |
|---|---|---|
| CN | 203172712 U | 9/2013 |
| JP | 53-149133 U | 4/1978 |
| JP | 60-169063 U | 11/1985 |
| JP | 04-088539 U | 7/1992 |
| JP | 10-338156 A | 12/1998 |
| JP | 2004-142544 A | 5/2004 |
| JP | 2011-131612 A | 7/2011 |
| JP | 2013-245710 A | 12/2013 |

OTHER PUBLICATIONS

U.K. Search Report mailed Jan. 27, 2015 for the corresponding U.K. Application No. 1413522.2.
Office Action mailed Mar. 15, 2016 for the corresponding Japanese Patent Application No. 2014-021659.

* cited by examiner

*Primary Examiner* — Jacob Knutson
(74) *Attorney, Agent, or Firm* — Leason Ellis LLP

(57) ABSTRACT

A steering apparatus includes: a rotation shaft that is caused to rotate by steering of a steering unit; a housing that accommodates at least a part of the rotation shaft; an opening that is formed in the housing so as to communicate an inside of the housing with an outside thereof; a cover member that covers the opening while ensuring ventilation via the opening; and an outer circumferential wall that is provided along an outer circumference of the cover member, wherein the outer circumferential wall has a cutout in a lower portion in a vertical direction of the outer circumferential wall.

17 Claims, 7 Drawing Sheets

STEERING APPARATUS AND HOUSING FOR STEERING APPARATUS

CROSS-REFERENCE TO RELATED APPLICATIONS

This application is based on and claims priority under 35 USC 119 from Japanese Patent Application No. 2014-021659 filed on Feb. 6, 2014, the entire content of which is incorporated herein by reference.

BACKGROUND OF THE INVENTION

1. Technical Field

The present invention relates to a steering apparatus and a housing for a steering apparatus.

2. Related Art

For example, a steering apparatus for a vehicle or the like is configured to include an input shaft that is caused to rotate by steering of a steering wheel, a pinion shaft that is connected to the input shaft, a rack shaft that has a rack connected to a pinion of the pinion shaft, and a housing that covers at least a part of the input shaft.

Here, Patent Literature 1 (JP-A-10-338156) discloses the following sealing structure of a center take-off gear housing of the steering apparatus so as to prevent the intrusion of water into a dust boot or a gear housing. Inside ends of a pair of right and left tie rods are connected to the rack via respective bolts that pass through a guide shoe which moves in a sliding manner inside a long hole formed along a longitudinal direction of the gear housing. The inside ends moves in a right and left direction in association with a right and left movement of the rack while being guided by the guide shoe. The bolts pass through a substantially center portion of the dust boot between the guide shoe and the pair of right and left tie rods, respectively, and the substantially center portion is interposed therebetween. A washer is installed between the dust boot and each inside end of the pair of right and left tie rods. A lip made of a synthetic resin elastic material is baked onto an inner circumferential edge of the washer so as to be in close contact with an outer circumferential surface of the bolt and to prevent the intrusion of water.

SUMMARY OF THE INVENTION

In the steering apparatus with a configuration in which an opening is provided in the housing covering at least a part of the input shaft so as to communicate an inside of the housing with an outside thereof, and the opening is covered with a cover member having breathability, for example, a worker may unintentionally touch the steering apparatus during installation of the steering apparatus on a vehicle, and thus an external force may be exerted on the cover member, and the cover member may fall out of the opening. In contrast, when a protective wall is provided along an outer circumference of the cover member, flying debris such as water, dirt, or dust may accumulate in a gap between the protective wall and the cover member.

An object of the present invention is to provide a structure of the steering apparatus, in which the cover member, which covers the opening provided in the housing, is prevented from falling out of the opening, and the flying debris is prevented from accumulating in the vicinity of the cover member or the opening.

A steering apparatus according to an aspect of the present invention includes a rotation shaft that is caused to rotate by steering of a steering unit; a housing that accommodates at least a part of the rotation shaft; an opening that is formed in the housing so as to communicate an inside of the housing with an outside thereof; a cover member that covers the opening while ensuring ventilation via the opening; and an outer circumferential wall that is provided along an outer circumference of the cover member. The outer circumferential wall has a cutout in a lower portion in a vertical direction of the outer circumferential wall.

Here, the outer circumferential wall may be formed at least at a location in which the outer circumferential wall faces the cutout with the cover member interposed therebetween.

The outer circumferential wall may include another cutout at a location different from the location in which the cutout is positioned in a circumferential direction of the cover member.

The outer circumferential wall may have a protruding shape so as to protrude inwardly in a radial direction of the outer circumferential wall.

The steering apparatus may include a pinion shaft that is connected to the rotation shaft; and a rack shaft that has a rack connected to a pinion of the pinion shaft. The opening may be positioned above the rack shaft.

A portion of the housing may be provided so as to accommodate at least a part of the rotation shaft and to incline in the vertical direction. The opening may be formed on an upwardly facing surface of the inclining housing.

A housing for a steering apparatus according to another aspect of the present invention accommodates at least a part of a rotation shaft that is caused to rotate by steering of a steering unit. The housing for a steering apparatus includes a main body portion that covers at least a part of the rotation shaft; an opening that communicates an inside of the main body portion with an outside thereof; an attached portion to which a cover member is attached so as to cover the opening while ensuring ventilation via the opening; and a protrusion portion that protrudes outwardly from a side surface of the main body portion, and is provided along an outer circumference of the attached portion.

According to the aspects of the present invention, the cover member, which covers the opening provided in the housing, can be prevented from falling out of the opening, and flying debris can be prevented from accumulating in the vicinity of the cover member or the opening.

DETAILED DESCRIPTION OF THE INVENTION

Hereinafter, an embodiment of the present invention will be described with reference to the accompanying drawings.

Motor-Driven Power Steering Apparatus 1

Figure 1:
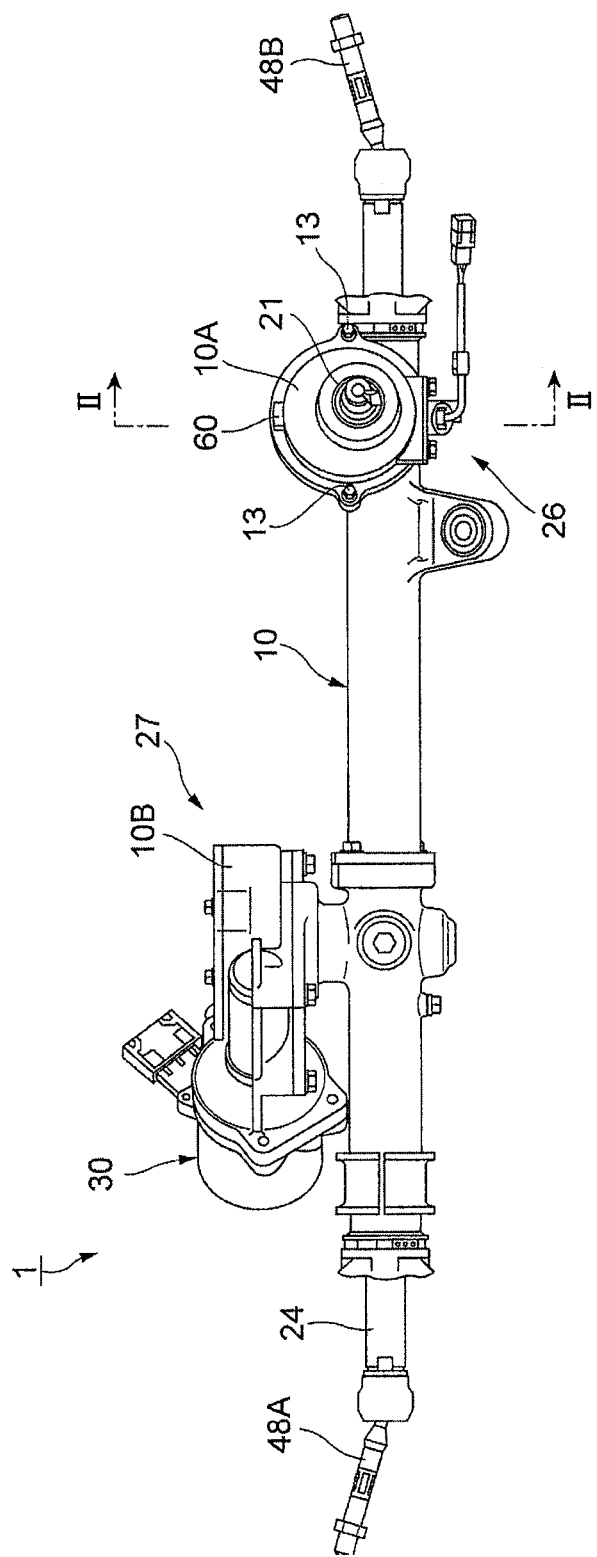
FIG. 1 is a schematic top view of a motor-driven power steering apparatus according to an embodiment.

FIG. 1 is a schematic top view of a motor-driven power steering apparatus 1 according to the embodiment.

Figure 2:
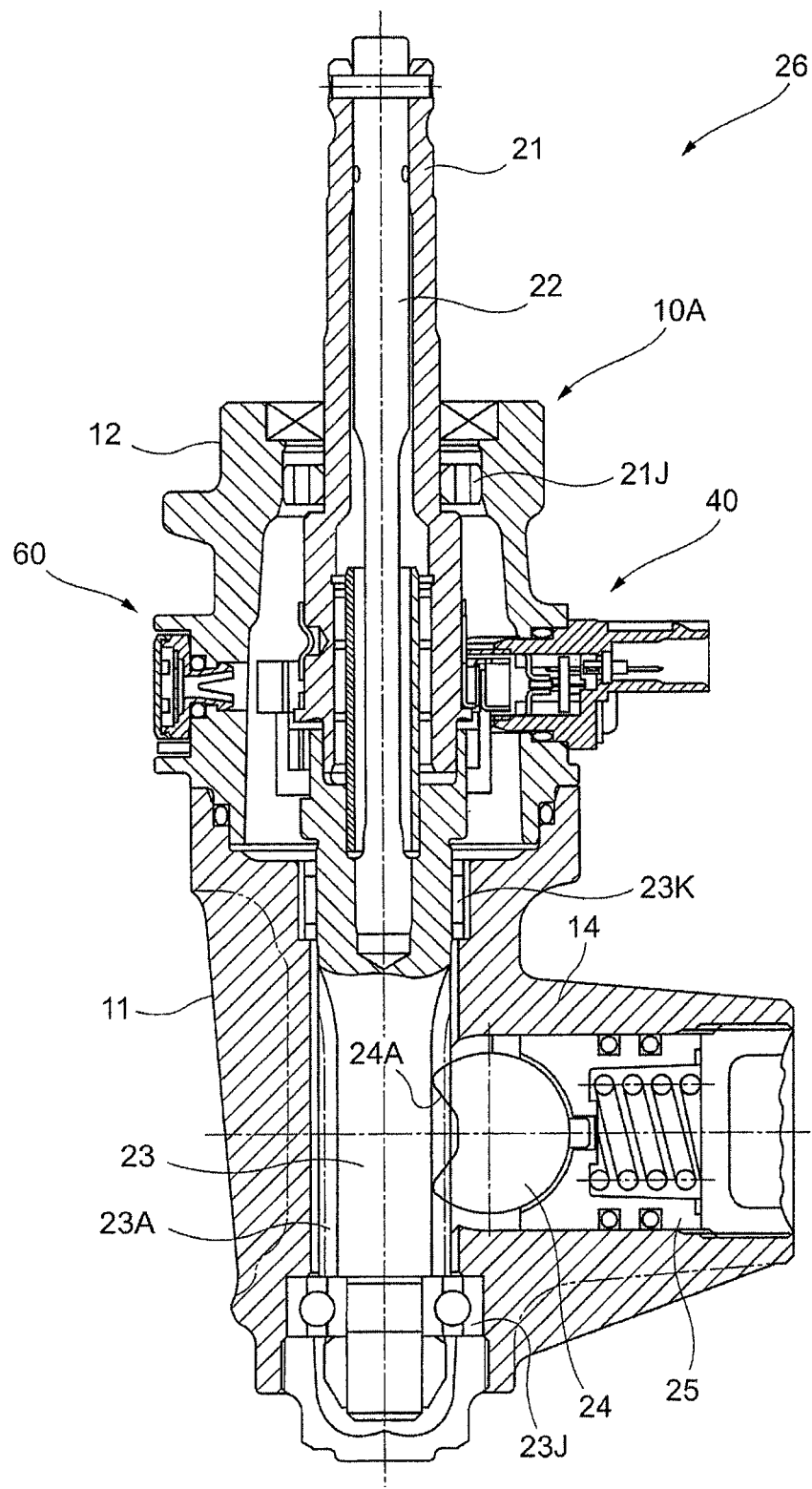
FIG. 2 is a configuration view describing a transmission mechanism unit of the motor-driven power steering apparatus according to the embodiment.

FIG. 2 is a configuration view describing a transmission mechanism unit 26 of the motor-driven power steering apparatus 1 according to the embodiment, and a cross-sectional view taken along line II-II in FIG. 1.

As illustrated in FIG. 1, the motor-driven power steering apparatus 1 according to the embodiment is a so-called double pinion power steering apparatus. The motor-driven power steering apparatus 1 has the transmission mechanism unit 26 that transmits a steering force from a steering unit (a steering wheel, not illustrated) to a rack shaft 24, and an assist unit 27 that transmits an auxiliary steering force from a drive unit 30 to the rack shaft 24, and assists movement of the rack shaft 24.

For example, as illustrated in FIG. 1, a gear housing 10 fixed to a vehicle body frame (not illustrated) or the like has a steering wheel-side gear housing 10A of the transmission mechanism unit 26 and an assist-side gear housing 10B of the assist unit 27. The gear housing 10 is configured in such a manner that the steering wheel-side gear housing 10A and the assist-side gear housing 10B are connected to each other around the rack shaft 24.

The steering wheel-side gear housing 10A rotatably supports an input shaft 21 which is an example of a rotation shaft, and a steering wheel-side pinion shaft 23 (refer to FIG. 2) which is an output shaft. In contrast, the assist-side gear housing 10B rotatably supports an assist-side pinion shaft (not illustrated).

A left tie rod 48A and a right tie rod 48B are respectively connected to both end portions of the rack shaft 24. Each of the tie rods 48A and 48B is connected to a steered unit such as a tire (not illustrated) via a knuckle arm (not illustrated).

Transmission Mechanism Unit 26

As illustrated in FIG. 2, the steering wheel-side gear housing 10A of the transmission mechanism unit 26 is divided into a first housing 11 and a second housing 12. The first housing 11 and the second housing 12 are assembled together so as to form the housing. The first housing 11 and the second housing 12 are fixed using fixation bolts 13 (refer to FIG. 1).

As illustrated in FIG. 2, the transmission mechanism unit 26 has the input shaft 21 that is connected to the steering wheel (not illustrated) via an upper shaft (not illustrated). The transmission mechanism unit 26 has the steering wheel-side pinion shaft (the output shaft) 23 that is coaxially connected to the input shaft 21 via a torsion bar 22.

The steering wheel-side pinion shaft 23 has a pinion 23A, and the pinion 23A meshes with a steering wheel-side rack 24A of the rack shaft 24. Accordingly, the rack shaft 24 can linearly move based on a steering torque exerted on the steering wheel, and moves in a right and left direction of the gear housing 10 illustrated in FIG. 1.

The input shaft 21 is retained by a bearing 21J that is provided in the second housing 12 of the steering wheel-side gear housing 10A. The steering wheel-side pinion shaft 23 is retained by bearings 23J and 23K which are provided in the first housing 11 of the steering wheel-side gear housing 10A.

A rack guide 25 is provided in the first housing 11 of the steering wheel-side gear housing 10A so as to push the steering wheel-side rack 24A of the rack shaft 24 against the pinion 23A of the steering wheel-side pinion shaft 23, and to slidably support the rack shaft 24. The rack guide 25 is inserted into a cylinder portion 14 which is a part of the first housing 11.

Furthermore, the transmission mechanism unit 26 includes a torque detection device 40 that detects a relative rotational angle between the input shaft 21 and the steering wheel-side pinion shaft (the output shaft) 23, and detects a steering torque based on the detected relative rotational angle. The torque detection device 40 transmits the detected steering torque result to an electronic control unit (an ECU) which is not illustrated. The ECU controls the drive unit 30 (refer to FIG. 1) of the assist unit 27 based on the detected steering torque result acquired from the torque detection device 40.

In the motor-driven power steering apparatus 1 with the aforementioned configuration, based on the fact that a steering torque exerted on the steering wheel is indicated by a relative rotational angle between the input shaft 21 and the steering wheel-side pinion shaft (the output shaft) 23, the torque detection device 40 calculates the steering torque based on the relative rotational angle between the input shaft 21 and the steering wheel-side pinion shaft 23. That is, the torque detection device 40 detects a relative rotational angle between the input shaft 21 and the steering wheel-side pinion shaft 23. The ECU calculates a steering torque based on an output value from the torque detection device 40, and controls driving of the drive unit 30 based on the calculated steering torque.

A torque occurring in the drive unit 30 is transmitted to the steering wheel-side pinion shaft 23, and thus an operator exerted steering torque on the steering wheel is assisted. That is, the steering wheel-side pinion shaft 23 is caused to rotate by a combination of a steering torque caused by rotation of the steering wheel and an auxiliary torque given by the drive unit 30.

Second Housing 12

Figure 3:
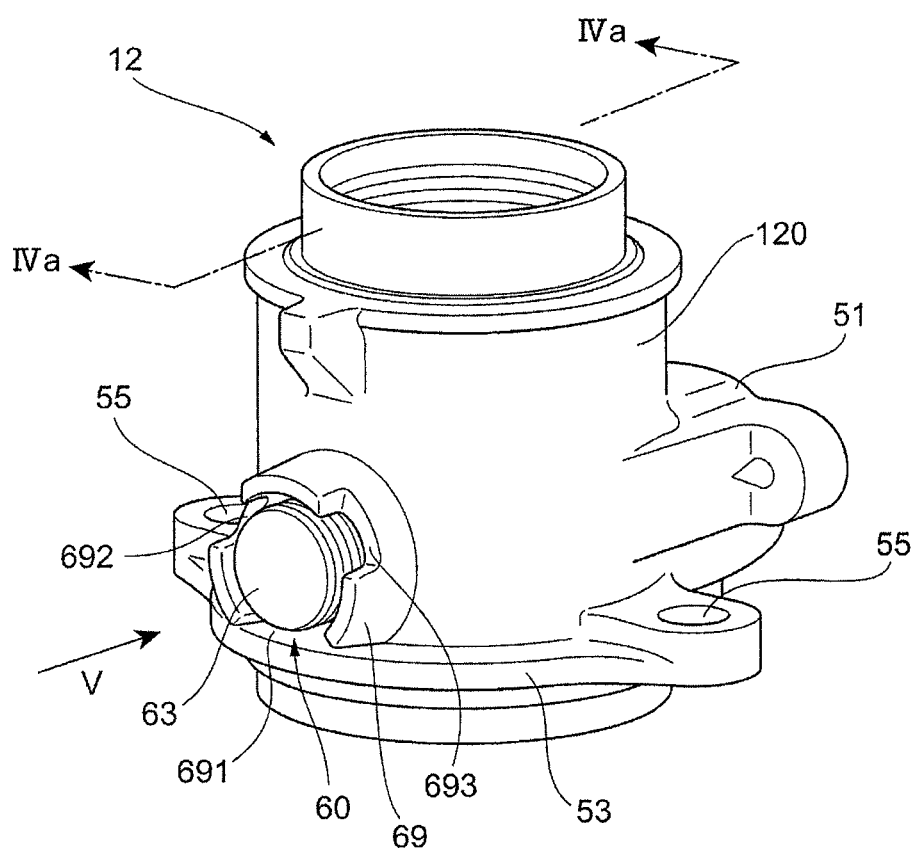
FIG. 3 is a perspective view of a second housing.

FIG. 3 is a perspective view of the second housing 12.

As illustrated in FIG. 3, the second housing 12 is an example of a housing or a housing for a steering apparatus, and is a member of a substantially cylindrical outline, and the second housing 12 can be made of a metallic material such as aluminum.

The second housing 12 includes a torque detection device attaching hole 51 which is formed on a side surface 120 of the second housing 12 that is an example of a main body portion, and in which the torque detection device 40 (refer to FIG. 2) is disposed; a flange portion 53 that protrudes outwardly in a radial direction from the side surface 120 of the second housing 12, and extends along a circumferential direction of the side surface 120; a fixation bolt hole 55 which is provided in the flange portion 53, and into which the fixation bolt 13 (refer to FIG. 1) is inserted so as to fix the second housing 12 to the first housing 11 (refer to FIG. 2); and a ventilation mechanism 60 that is provided in the side surface 120 of the second housing 12, and forms a flow path so as to allow air to flow therethrough between the inside and the outside of the second housing 12.

Ventilation Mechanism 60

Figure 4A:
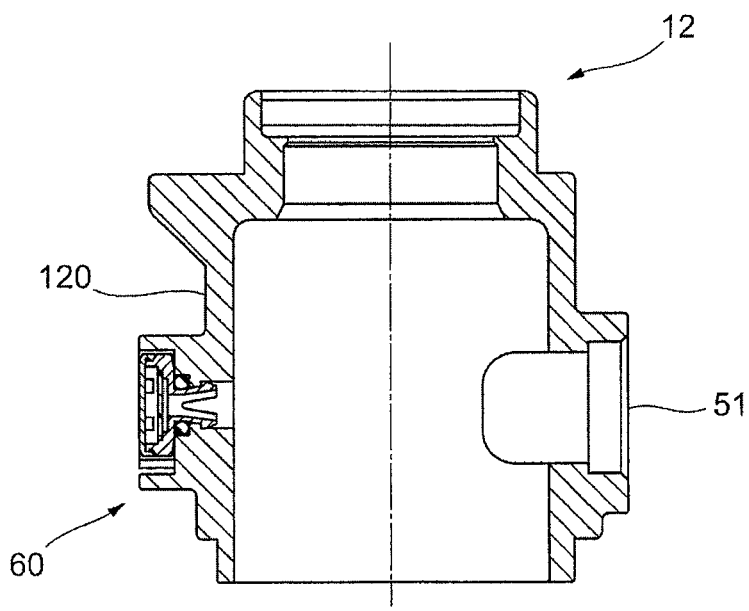
FIGS. 4A and 4B are views describing a ventilation mechanism.
Figure 4B:
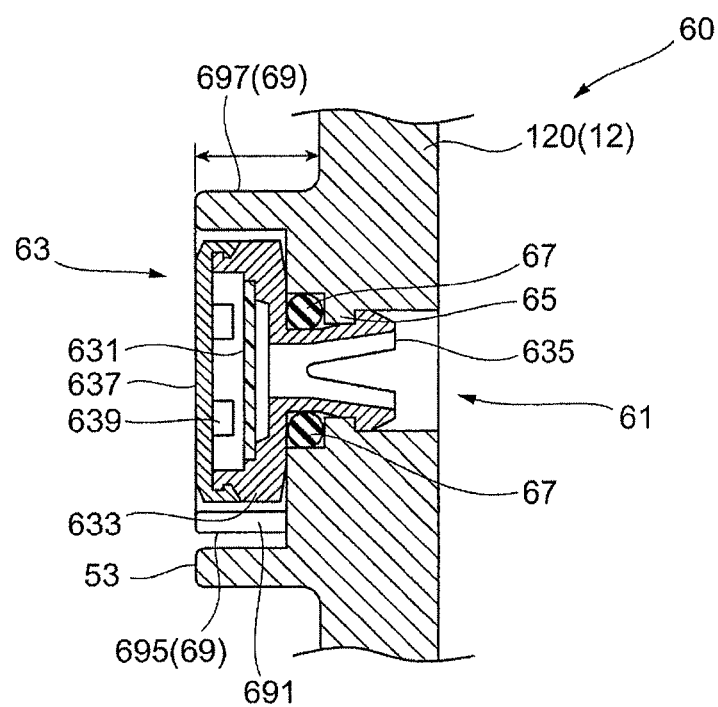

FIGS. 4A and 4B are views describing the ventilation mechanism 60. More specifically, FIG. 4A is a cross-sectional view taken along line IVA-IVA in FIG. 3, and FIG. 4B is an enlarged view of the vicinity of the ventilation mechanism 60 illustrated in FIG. 4A.

As illustrated in FIG. 4A, the ventilation mechanism 60 is provided so as to be positioned opposite to the torque detection device attaching hole 51 on the side surface 120 of the second housing 12, more specifically, the ventilation mechanism 60 is provided at a position in which the ventilation mechanism 60 faces the torque detection device attaching hole 51 with a center axis of the ventilation mechanism 60 interposed therebetween.

As illustrated in FIG. 413, the ventilation mechanism 60 includes a ventilation hole 61; a cover member 63 that covers the ventilation hole 61; a locking portion 65 which is provided on an inner circumferential surface of the ventilation hole 61, and by which the cover member 63 is caught; an O-ring 67 that seals a gap between the side surface 120 of the second housing 12 and the cover member 63; and a protective wall 69 (to be described later) that is provided along an outer circumference of the cover member 63.

The ventilation hole 61 is an example of an opening, and is a through hole that is provided in the side surface 120 of the second housing 12. The ventilation hole 61 functions as a flow path through which air flows between the inside and the outside of the second housing 12.

The cover member 63 includes a ventilation film 631; a retention body 633 for retention of the ventilation film 631; and a hook portion 635 that is hooked onto the locking portion 65. Here, the ventilation film 631 is a membranous member that has breathability, and prevents the intrusion of water, dirt, or the like from the outside. That is, the ventilation film 631 is a member having breathability, waterproof properties, and dust-proof properties, and a GORE® polytetrafluoroethylene membrane can be used.

The retention body 633 is a resin-made member of a substantially cylindrical outline. The retention body 633 retains the ventilation film 631 therein in a direction orthogonal to a center axis of the retention body 633. In a state where the cover member 63 is attached into the ventilation hole 61, the retention body 633 includes a ventilation region 639 that is formed as a through hole in a side surface of the retention body 633 so as to be positioned in a radial direction of the second housing 12 further outwardly (the left in FIG. 4B) than the ventilation film 631.

The hook portion 635 is a resin-made member that is integrally formed with the retention body 633. When the elastically deformed hook portion 635 is hooked onto the locking portion 65, the cover member 63 is fixed to the side surface 120 of the second housing 12. In addition, the hook portion 635 functions as a so-called snap-fit. Here, the embodiment is described in which the cover member 63 is fixed using the hook portion 635, but the cover member 63 may be fixed using a well-known fixation method such as adhesion, welding, or screw-in.

A cover 637 is a resin-made member of a substantially disc-shaped outline that covers the ventilation film 631 at a position apart from the ventilation film 631 of a predetermined distance. The cover 637 prevents a small stone or the like from colliding with the ventilation film 631 to thereby causing damage of the ventilation film 631.

The inner circumferential surface of the ventilation hole 61 protrudes inwardly in a radial direction of the ventilation hole 61 so as to form the locking portion 65 which is an example of an attached portion. The locking portion 65 is formed so as to receive the hook portion 635 of the cover member 63.

The O-ring 67 is an elastic member that is provided between the inner circumferential surface of the ventilation hole 61 and an outer circumferential surface of the retention body 633 in the cover member 63. In a state where the hook portion 635 of the cover member 63 is hooked onto the locking portion 65, the O-ring 67 seals a gap between the cover member 63 and the ventilation hole 61 (the side surface 120).

The ventilation mechanism 60 with the aforementioned configuration prevents a pressure change in association with a temperature change in the second housing 12 while preventing the intrusion of flying debris such as water, dirt, or dust into the inside from the outside of the second housing 12. Specifically, even when the motor-driven power steering apparatus 1 is used under severe conditions, for example, at a high altitude having a low atmospheric pressure and a high ambient temperature, the ventilation mechanism 60 can discharge air in the second housing 12 to the outside via the ventilation hole 61, the ventilation film 631, and the ventilation region 639.

Here, as illustrated in FIG. 1, an inner portion of the second housing 12 is a continuation of the entire inner portion of the gear housing 10. The description is omitted above, but the inner portion of each dust boot (not illustrated) provided in each end portion of the rack shaft 24 is a continuation of the inner portion of the gear housing 10. Accordingly, when the motor-driven power steering apparatus 1 is used under the aforementioned low atmospheric pressure and high ambient temperature conditions, the volume of air in the gear housing 10 and the dust boot may increase, and the dust boot may swell. The swollen dust boot can cause a resistant force against movement of the rack shaft 24. However, as described above, since the ventilation mechanism 60 discharges air in the second housing 12, a resistant force imparted on the rack shaft 24 by the swollen dust boot is limited.

In the embodiment, it is possible to discharge air in the entire inner portion of the gear housing 10 via a single ventilation mechanism 60 by providing the ventilation mechanism 60 in the second housing 12 of the gear housing 10.

Since the configuration is adopted in which the second housing 12 includes the ventilation mechanism 60, the ventilation mechanism 60 is further apart from a road surface, for example, compared to a configuration in which the ventilation mechanism 60 is provided in a region of the gear housing 10, which covers the rack shaft 24. Accordingly, flying debris from a road surface is unlikely to stick to the ventilation mechanism 60. Furthermore, since the ventilation mechanism 60 is provided above the flange portion 53 of the second housing 12, flying debris from a road surface is unlikely to stick to the ventilation mechanism 60.

Protective Wall 69

Figure 5:
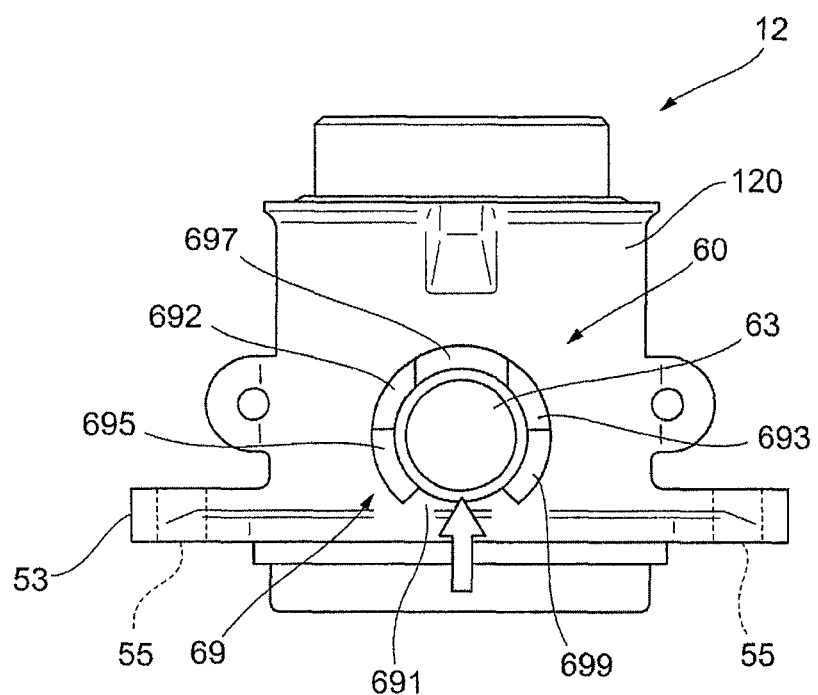
FIG. 5 is a schematic configuration view of the second housing when seen from arrow V in FIG. 3, FIGS. 6A to 6C are views describing modification examples of a protective wall.

FIG. 5 is a schematic configuration view of the second housing 12 when seen from arrow V in FIG. 3.

The protective wall 69 is an example of an outer circumferential wall and a protrusion portion, and is provided along a circumferential direction of the cover member 63 so as to surround the outer circumference of the cover member 63. More specifically, the protective wall 69 is an annular-shaped (arc-shaped) member that is provided along the outer circumference of the cover member 63.

The protective wall 69 is made of metal such as aluminum. In the illustrated example, the protective wall 69 is integrally formed with the second housing 12 using a die casting method. The protective wall 69 may be formed separate from the second housing 12, and may be fixed to the second housing 12 using a well-known fixation method such as adhesion, welding, or screw-in. The protective wall 69 is not limited to being made of metal, and may be made of other material such as resin.

Here, as illustrated in FIG. 4B, the height (a length in a right and left direction in FIG. 4B, and refer to the arrow) of the protective wall 69 from the side surface 120 of the second housing 12 is substantially the same as that of the cover member 63 provided in the ventilation hole 61. More specifically, the height of the protective wall 69 is set so as to cover the ventilation region 639 of the cover member 63.

The protective wall 69 is provided in the outer circumference of the cover member 63. Accordingly, for example, when a worker unintentionally touches the cover member 63 during installation of the motor-driven power steering apparatus 1 on a vehicle, the cover member 63 is prevented from receiving an external force caused by the unintentional touch, and from falling out of the ventilation hole 61. In particular, as illustrated in the example, in the configuration in which the hook portion 635 is hooked onto the locking portion 65 so as to fix the cover member 63, the cover member 63 can more easily fall out of the ventilation hole 61 compared to a configuration in which the cover member 63 is fixed using, for example, adhesion. However, the protective wall 69 prevents the cover member 63 from falling out of the ventilation hole 61.

In addition, the protective wall 69 prevents flying debris from reaching the ventilation region 639 of the cover member 63.

In this configuration, it is expected that flying debris such as water or dirt may accumulate in a portion (a gap portion) between the protective wall 69 and the cover member 63. When water or dirt accumulates in the portion between the protective wall 69 and the cover member 63, the side surface 120 of the second housing 12 or the protective wall 69 can corrode. As a result, for example, the inner portion of the second housing 12 may be exposed. Alternatively, clogging caused by the dirt may restrict ventilation via the ventilation region 639 of the cover member 63.

As illustrated in FIG. 5, the protective wall 69 of the embodiment includes a plurality of cutouts (slits, and a first cutout 691 to a third cutout 693), and the height of each cutout from the side surface 120 of the second housing 12 is lower than those of other portions in the circumferential direction of the protective wall 69. Here, regions in the circumferential direction of the protective wall 69, in which the first cutout 691 to the third cutout 693 are not formed, are respectively referred to as a first region 695, a second region 697, and a third region 699.

Here, the first cutout 691 is positioned below the cover member 63 in a vertical direction. More specifically, the first cutout 691 is provided on a lower side of the protective wall 69 in the vertical direction. The second cutout 692 and the third cutout 693 are positioned above the first cutout 691 in the vertical direction, and are positioned on sides of the cover member 63. Accordingly, each of the second cutout 692 and the third cutout 693 functions as an air flow path while water or dirt is discharged via the first cutout 691.

In a region in which the first cutout 691 is formed, a height (the length in the right and left direction in FIG. 4B) from the side surface 120 of the second housing 12 is zero. In other words, the region in which the first cutout 691 is formed coincides in height with the side surface 120 of the second housing 12.

In contrast, each of the second cutout 692 and the third cutout 693 from the side surface 120 of the second housing 12 has a height higher than that of the first cutout 691, and has a height lower than that of the ventilation region 639 of the cover member 63. Accordingly, the protective wall 69 prevents an air flow via the ventilation region 639 in the cover member 63 from being restricted, and prevents an external force from being exerted on the cover member 63.

The width (a length in the circumferential direction) of each of the first cutout 691 to the third cutout 693 is set to a dimension in such a manner that the fingers of a worker are unable to enter the first cutout 691 to the third cutout 693. For example, the width may be set to approximately 10 mm to 15 mm.

The first cutout 691 to the third cutout 693 are disposed so as to be apart from each other at substantially the same interval in the circumferential direction. Here, even when the cover member 63 is pressed through any one of the first cutout 691 and the third cutout 693, the first cutout 691 to the third cutout 693 are disposed in such a manner that the cover member 63 is supported by any one of the first region 695 to the third region 699 of the protective wall 69. In other words, at least a part of the protective wall 69 is formed at a location in which a part of the protective wall 69 faces any one of the first cutout 691 to the third cutout 693.

For example, as illustrated in FIG. 5, even when the cover member 63 is pressed through the first cutout 691 (refer to the arrow in FIG. 5), the second region 697 is disposed at a position opposite to the first cutout 691 with the cover member 63 interposed therebetween. Accordingly, the cover member 63 moving upwardly in FIG. 5 can be supported by the second region 697. As a result, the cover member 63 is prevented from falling out of the ventilation hole 61. Similarly, the third region 699 and the first region 695 are respectively disposed at positions opposite to the second cutout 692 and the third cutout 693 with the cover member 63 interposed between the third region 699 and the second cutout 692, and between the first region 695 and the third cutout 693.

Modification Examples

Figure 6A:
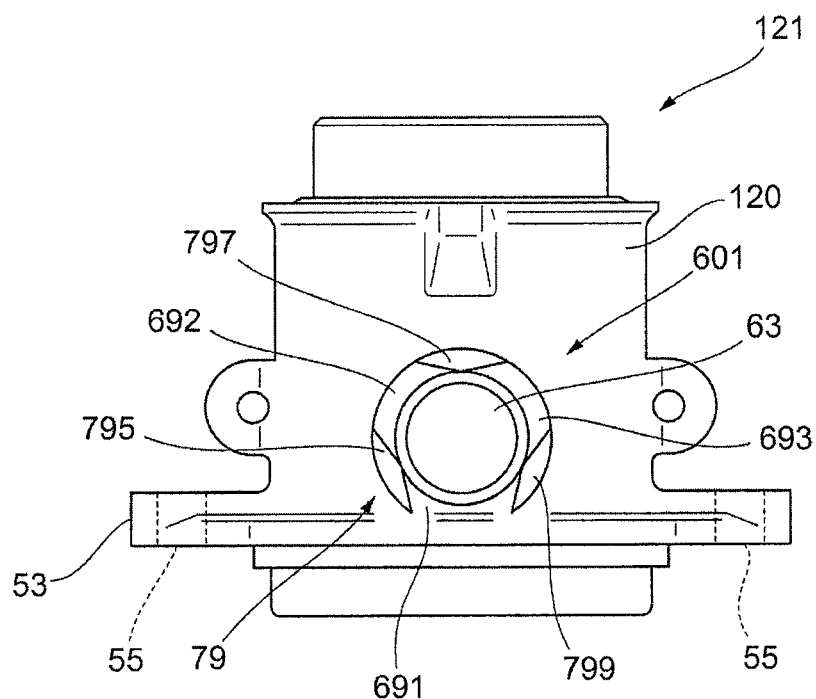
Figure 6B:
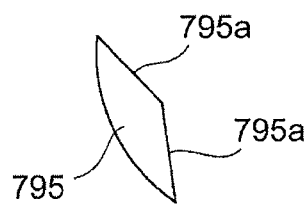
Figure 6C:
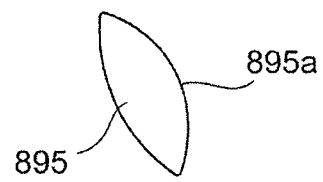

FIGS. 6A to 6C are views describing modification examples of the protective wall 69.

FIGS. 7A to 7D are views describing modification examples of the protective wall 69.

In the following description, the same reference signs are assigned to the same portions as those of the second housing 12 illustrated in FIG. 5, and the descriptions will be omitted.

In the protective wall 69 illustrated in FIG. 5, an inner circumferential surface of each of the first region 695 to the third region 699 has a substantially arc shape along an outer circumference of the ventilation hole 61, in other words, the inner circumferential surface has a concave shape, but the inner circumferential surface may have another shape.

For example, in a ventilation mechanism 601 of a second housing 121 illustrated in FIG. 6A, each of a first region 795 to a third region 799 of a protective wall 79 has an inner circumferential surface of a protruding shape. Specifically, in each of the first region 795 to the third region 799, a circumferentially center portion of the inner circumferential surface protrudes inwardly in a radial direction of the protective wall 79 further than circumferentially end portions of the inner circumferential surface. More specifically, the inner circumferential surface of each of the first region 795 to the third region 799 includes inclining slopes 795a (a taper, refer to FIG. 6B), each of which inclines outwardly in the radial direction from the circumferentially center portion toward the circumferentially end portion. In this configuration, it is easy to discharge flying debris accumulating in a portion between the protective wall 79 and the cover member 63 to the outside of the protective wall 79 via a first cutout 691 to a third cutout 693.

As in a first region 895 illustrated in FIG. 6C, the first region 895 may be configured to include a curved surface 895a, a circumferentially center portion of which protrudes inwardly in a radial direction further than circumferentially end portions.

Figure 7A:
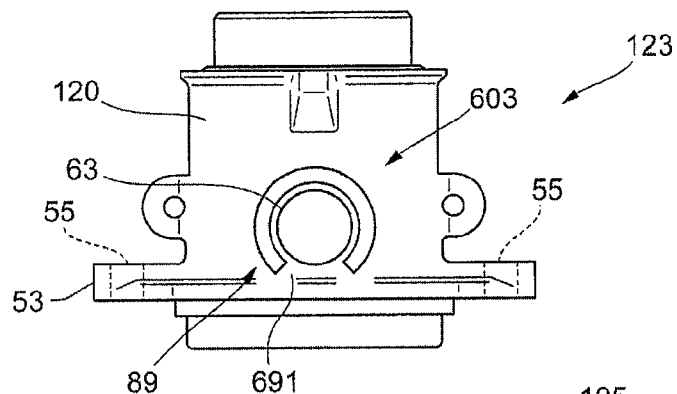
FIGS. 7A to 7D are views describing modification examples of the protective wall.

As in a ventilation mechanism 603 of a second housing 123 illustrated in FIG. 7A, a protective wall 89 may be configured to include the first cutout 691 which is only a single cutout provided in a circumferential direction. The protective wall 89 protrudes outwardly in a radial direction from the side surface 120 of the second housing 123. The protective wall 89 is treated as a protrusion that extends along the outer circumference of the cover member 63 and has an open portion below the cover member 63.

Figure 7B:
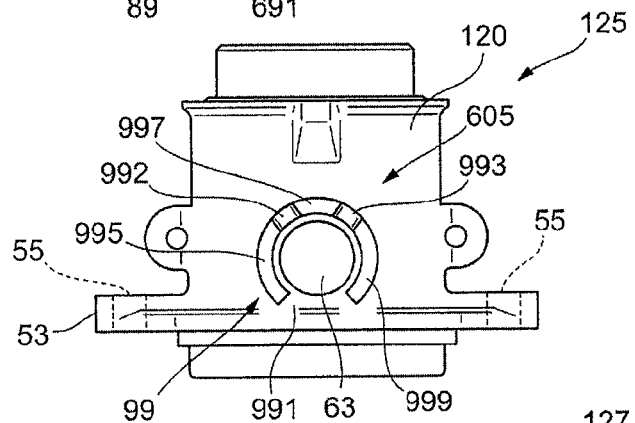

As in a ventilation mechanism 605 of a second housing 125 illustrated in FIG. 7B, cutouts (a first cutout 991 to a third cutout 993) provided in a protective wall 99 may be formed so as to be positioned at uneven intervals in a circumferential direction. In this configuration, a first region 995 and a third region 999 are formed so as to have a relatively long length in the circumferential direction, and a second region 997 is formed so as to have a relatively short length in the circumferential direction.

Figure 7C:
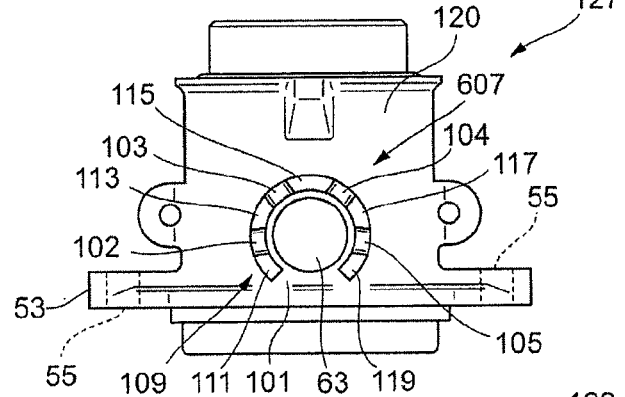

As in a ventilation mechanism 607 of a second housing 127 illustrated in FIG. 7C, a configuration may be adopted in which a number of cutouts greater than or equal to three are provided in a protective wall 109. In the configuration illustrated in FIG. 7C, five cutouts, a first cutout 101 to a fifth cutout 105 are formed, and five regions (a first region 111 to a fifth region 119) are formed between the respective cutouts.

Figure 7D:
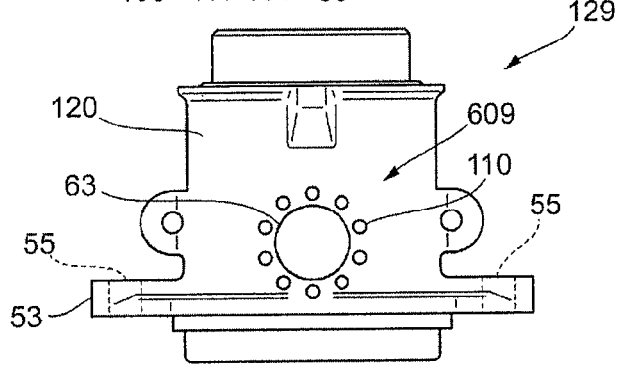

As in a ventilation mechanism 609 of a second housing 129 illustrated in FIG. 7D, a configuration may be adopted in which the second housing 129 has a plurality of protrusions 110 provided along the outer circumference of the cover member 63. In the illustrated example, the protrusion 110 has a substantially columnar shape so as to protrude outwardly in a radial direction from an outer circumferential surface of the second housing 129. However, the protrusion 110 may have another shape such as a rectangular parallelepiped shape or a truncated conical shape.

In the protective wall 69 described above, the height of the first cutout 691 from the side surface 120 of the second housing 12 is different from those of the second cutout 692 and the third cutout 693. However, the first cutout 691 to the third cutout 693 may have the same height, and may have heights different from each other.

In addition, for example, the second cutout 692 and the third cutout 693 may coincide in height with the side surface 120 of the second housing 12 like the first cutout 691 illustrated in FIG. 5. Alternatively, the first cutout 691 may have a height lower than that of the ventilation region 639 (refer to FIG. 4B) of the cover member 63 like the second cutout 692 and the third cutout 693 illustrated in FIG. 5.

Here, when the second housing 12 is provided in the motor-driven power steering apparatus 1 so as to incline in a vertical direction, the ventilation mechanism 60 is preferably provided on an upwardly facing surface of the side surface 120 of the second housing 12. As a result, flying debris from a road surface is unlikely to stick to the ventilation mechanism 60.

The ventilation mechanism 60 may be provided at a location other than the second housing 12 in the gear housing 10. For example, the ventilation mechanism 60 may be provided in a region of the gear housing 10, which covers the rack shaft 24. Furthermore, the motor-driven power steering apparatus 1 may be configured to include a plurality of the ventilation mechanisms 60, for example, in the gear housing 10, the ventilation mechanisms 60 may be respectively provided both in the second housing 12 and in the region which covers the rack shaft 24.

The modification examples in various forms are described above, and the modification examples may be combined together in any form.

The disclosure is not limited to the aforementioned embodiment, and can be realized in various forms insofar as the various forms do not depart from the scope of the disclosure.

What is claimed is:

1. A steering apparatus comprising:
    a rotation shaft that is caused to rotate by steering of a steering unit;
    a housing that accommodates at least a part of the rotation shaft;
    an opening that is formed in the housing so as to communicate an inside of the housing with an outside thereof;
    a cover member that has a ventilation region and covers the opening while ensuring ventilation via the opening through the ventilation region; and
    an outer circumferential wall that is provided along an outer circumference of the cover member, wherein
    the outer circumferential wall has a cutout in a lower portion in a vertical direction of the outer circumferential wall, the cutout being a first cutout ,
    a height of the outer circumferential wall is set so as to at least cover the ventilation region, and
    the outer circumferential wall has a second cutout and a third cutout that are provided above the first cutout in the vertical direction.

2. The steering apparat us according to claim 1,
    wherein the outer circumferential wall is formed at least at a location in which the outer circumferential wall faces the first cutout with the cover member interposed therebetween.

3. The steering apparatus according to claim 1, wherein the second cutout and the third cutout are located at a different location from the first cutout in a circumferential direction of the cover member.

4. The steering apparatus according to claim 1,
    wherein the outer circumferential wall has a protruding shape so as to protrude inwardly in a radial direction of the outer circumferential wall.

5. The steering apparatus according to claim 1, further comprising:
    a pinion shaft that is connected to the rotation shaft; and
    a rack shaft that has a rack connected to a pinion of the pinion shaft,
    wherein the opening is positioned above the rack shaft.

6. The steering apparatus according to claim 1,
    wherein a portion of the housing is provided so as to accommodate the at least part of the rotation shaft, and to incline in the vertical direction, and
    wherein the opening is formed on an upwardly facing surface of the inclined portion of the housing.

7. The steering apparatus according to claim 1, wherein the cover member substantially covers the opening.

8. The steering apparatus according to claim 1, wherein the outer circumferential wall comprises a structure that is separate and spaced from the cover member.

9. The steering apparatus according to claim 1, wherein an axis extending through a center of the opening intersects the cover member.

10. The steering apparatus according to claim 1, wherein cover members includes a ventilation film having breathability.

11. The steering apparatus according to claim 10, wherein the ventilation film has waterproof and dust-proof properties.

12. The steering apparatus according to claim 1, wherein the first cutout, the second cutout, and the third cutout extend in a radially outward direction of the housing.

13. The steering apparatus according to claim 1, wherein the housing has an attachment portion,
the cover member has a hook portion, and
the hook portion is hooked onto the attachment portion so as to fix the cover member to the housing.

14. The steering apparatus according to claim 1, wherein the outer circumferential wall is completely spaced from the cover member so as to allow the ventilation region to be open to atmosphere.

15. A steering apparatus comprising:
a rotation shaft that is caused to rotate by steering of a steering unit;
a housing that accommodates at least a part of the rotation shaft and has an attached portion;
an opening that is formed in the housing so as to communicate an inside of the housing with an outside thereof;
a cover member that covers the opening while ensuring ventilation via the opening; and
an outer circumferential wall that is provided along an outer circumference of the cover member, wherein
the outer circumferential wall has a cutout in a lower portion in a vertical direction of the outer circumferential wall, the cutout being a first cutout,
the cover member contains: (a) a ventilation film having breathability and (b) a hook portion which is hooked onto the attached portion so as to fix the cover member to the housing, and
the outer circumferential wall has a second cutout and a third cutout that are provided above the first cutout in the vertical direction.

16. A steering apparatus comprising:
a rotation shaft that is caused to rotate by steering of a steering unit;
a housing that accommodates at least a part of the rotation shaft;
an opening that is formed in the housing so as to communicate an inside of the housing with an outside thereof;
a cover member that has a ventilation region and covers the opening while ensuring ventilation via the opening through the ventilation region; and
an outer circumferential wall that is provided along an outer circumference of the cover member, wherein
the outer circumferential wall has a cutout in a lower portion in a vertical direction of the outer circumferential wall,
a height of the outer circumferential wall is set so as to at least cover the ventilation region, and
the outer circumferential wall is completely spaced from the cover member so as to allow the ventilation region to be open to atmosphere.

17. A steering apparatus comprising:
a rotation shaft that is caused to rotate by steering of a steering unit;
a housing that accommodates at least a part of the rotation shaft and has an attached portion;
an opening that is formed in the housing so as to communicate an inside of the housing with an outside thereof;
a cover member that has a ventilation region and covers the opening while ensuring ventilation via the opening; and
an outer circumferential wall that is provided along an outer circumference of the cover member, wherein
the outer circumferential wall has a cutout in a lower portion in a vertical direction of the outer circumferential wall,
the cover member contains: (a) a ventilation film having breathability and (b) a hook portion which is hooked onto the attached portion so as to fix the cover member to the housing, and
the outer circumferential wall is completely spaced from the cover member so as to allow the ventilation region to be open to atmosphere.

* * * * *